United States Patent [19]

Patton

[11] 3,853,654
[45] Dec. 10, 1974

[54] METHOD FOR SPLICING WEB END PORTIONS WITH PLASTIC RIVETS

[75] Inventor: David L. Patton, Rochester, N.Y.

[73] Assignee: Eastman Kodak Company, Rochester, N.Y.

[22] Filed: Feb. 28, 1973

[21] Appl. No.: 336,582

[52] U.S. Cl................ 156/157, 156/252, 156/290, 156/304, 156/502, 156/513
[51] Int. Cl............................................. B31f 5/00
[58] Field of Search ............ 156/157, 91, 252, 290, 156/304, 502, 513, 580, 510, 306

[56] References Cited
UNITED STATES PATENTS
3,499,808  3/1970  Obeda................................ 156/73
3,758,355  9/1973  Witherow ........................ 156/157

FOREIGN PATENTS OR APPLICATIONS
595,485  4/1960  Canada............................ 156/295
751,593  6/1956  Great Britain .................... 156/66

Primary Examiner—William A. Powell
Assistant Examiner—Brian J. Leitten
Attorney, Agent, or Firm—S. W. Gremban

[57] ABSTRACT

Web end portions are spliced together with plastic rivets formed from a soft pliable plastic. To form a splice, a patch of thermoplastic having the property of expanding when subjected to heat and pressure such as chlorinated polyethylene material, is placed on a splicing base. A pair of web end portions to be spliced together are placed in abutting or overlapped relation on the platic material to form a web-patch sandwich. A platen having an opening in register with the patch is brought into pressure engagement with the web-patch sandwich to form a pressurized plastic bubble extending into the opening. A heated pin of substantially the same configuration as the opening is moved therethrough for confining the opening and inserting a necked down head at the end thereof into the plastic in the bubble. The combination of heat, pressure and gas formation within the thermoplastic causes the visco-elastic plastic to expand through the opening in the web formed by the pinhead to fill the confined opening and form a plastic rivet head on the surface of the web opposite the patch.

8 Claims, 12 Drawing Figures 3,853,654
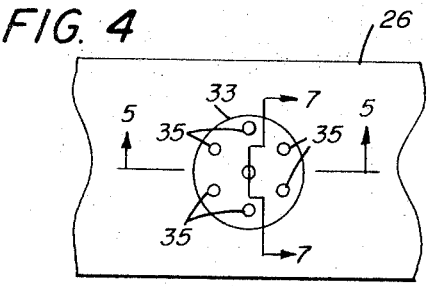
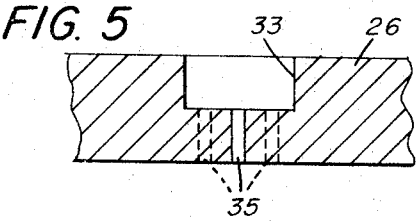
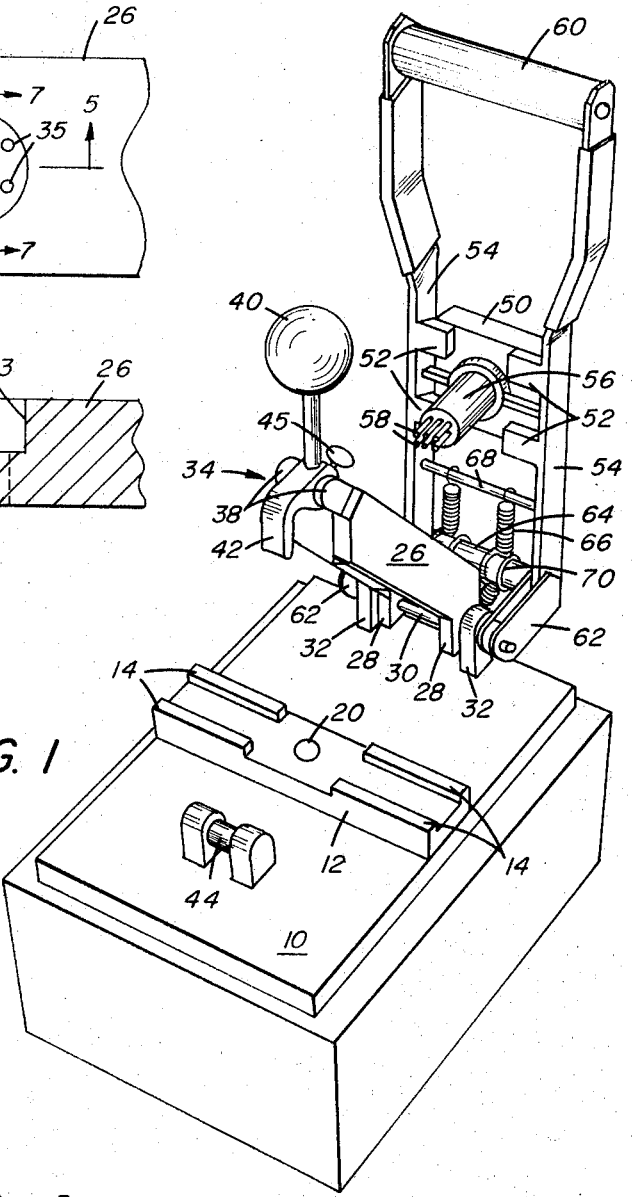
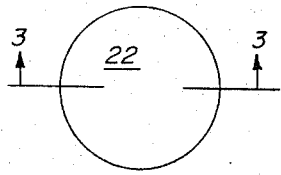
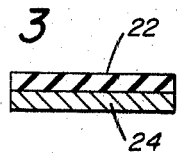

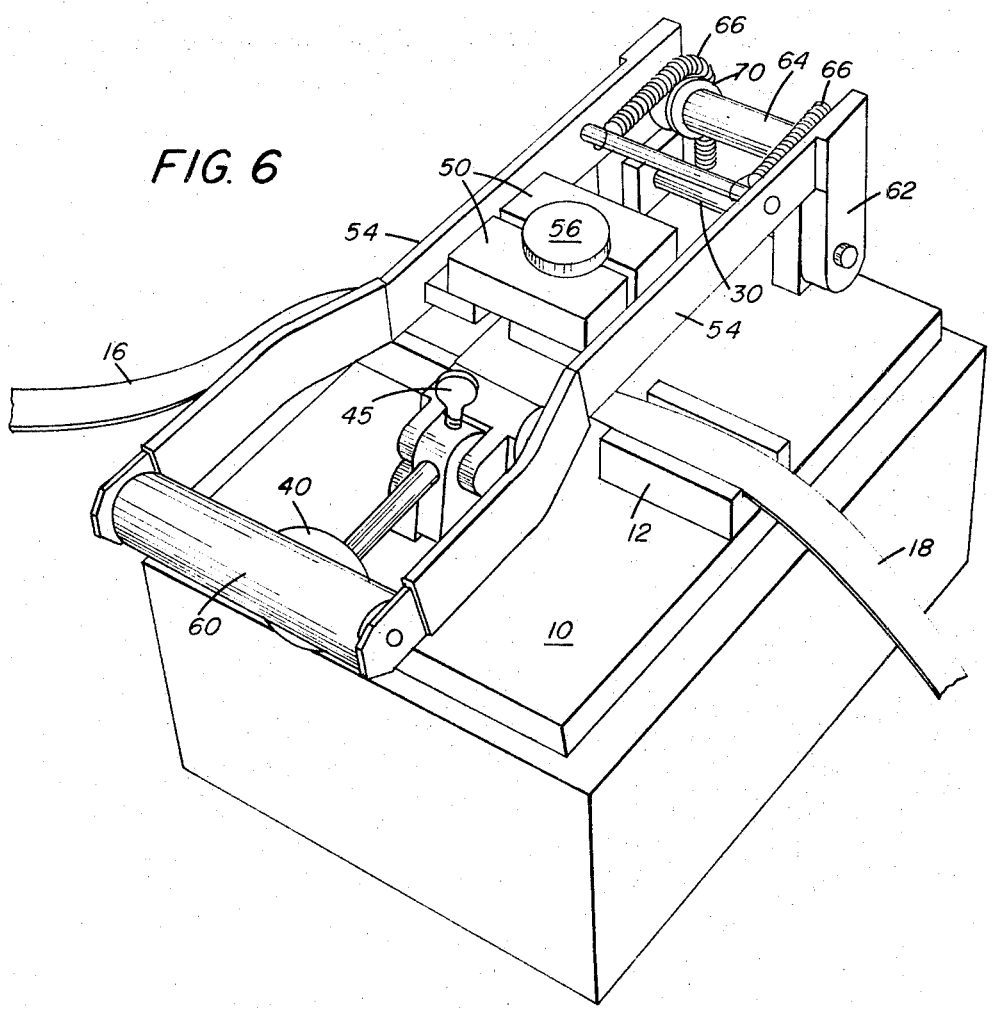

METHOD FOR SPLICING WEB END PORTIONS WITH PLASTIC RIVETS

BACKGROUND OF THE INVENTION

1. Field of the Invention

This invention relates generally to splicing, and more specifically to a method and apparatus for splicing web end portions together with plastic rivets.

2. Description of the Prior Art

It is known in the prior art to splice together two end portions of web material, such as photographic film or paper, by providing perforations through the end portions, positioning the end portions adjacent one another, placing thermoplastic resin on opposite sides of the end portions, and then causing the thermoplastic resin to flow through the perforations to unite the plastic resin layers. It is also known, as described in United States Patent Application Ser. No. 183,001, now U.S. Pat. No. 3,758,355 to splice web end portions together by providing a hole in the web end portions and positioning the end portions adjacent one another, placing thermoplastic resin on opposite sides of the end portions to form a film-resin sandwich, and inserting a heated pin through the hole in the sandwich, causing the resin to melt and unite to form a rivet. Splicing web end portions by pressure sensitive or heat sensitive adhesive tape, or by metal staples or rivet eyelets is also known. Although the described splicing methods and apparatus operate satisfactorily, they suffer from the disadvantages of (1) requiring special tools and hardware for accomplishing the splicing operation, (2) providing an unduly thick splice, (3) providing a splice that tends during processing to wear machine elements and is adversely affected by processing solutions such as bleaches, and (4) providing splices of inconsistent quality.

SUMMARY OF THE INVENTION

In accordance with a preferred embodiment of the invention, a method and apparatus for splicing web end portions together by plastic rivets is disclosed. The method for splicing web end portions together comprises placing on a splicing base a patch of thermoplastic material having the property of expanding when subjected to heat and pressure, such as chlorinated polyethylene or polyethylene containing a foaming agent. The thermoplastic material is preferably elastomeric and of the type having a low viscosity, when melted. Two web end portions to be joined or spliced are placed on the patch in abutting or overlapped relation to form a web-patch sandwich. The web-patch sandwich is pressed together by plates, to form a bubble in register with an opening in one of the plates into which the plastic flows under pressure. The bubble is preferably confined in the opening and punctured by a hot pin which burns a hole in the web and causes the plastic material to expand rapidly through the web hole encircling the pin, into the opening, and to overflow the outer surface of the web to form a rivet head. The rapid expansion of the plastic material is believed to be due to a combination of heat, pressure and gas formation within the plastic. The characteristic of the plastic is changed by the heat, that is, made harder when cooled. One or more of such rivets may be formed for splicing the web end portions, depending upon the degree of splicing strength desired. The thickness of the splice can be reduced by compressing the splice by pressure rollers or the like.

In a splicing apparatus for practicing the aforementioned method, a base is provided for receiving a patch of thermoplastic such as chlorinated polyethylene. The two web end portions to be spliced are positioned on the patch with one side of the web end portions in engagement with the patch to form a web-patch sandwich. A platen provided with at least one opening therethrough is preferably pivotally mounted on the base for movement into pressure engagement with the base for pressing the web-patch sandwich causing the plastic to flow into the opening to form a bubble in which the plastic is under pressure. Heated means is movable through the opening for confining the opening, burning a hole through the web, and puncturing the bubble, causing the plastic to become viscoelastic, and to be forced by heat, gas formation, and platen pressure through the web hole into the confined space to form a rivet head, when cooled, on the opposite side of the web.

One of the advantages of the present invention is to provide a plastic rivet splice for splicing web end portions having one or more layers such as a base, emulsion coating or rem jet backing. The plastic rivet splice is of high strength and endurance at high temperature, and further of consistently high quality. Another advantage is that the plastic rivet splice is soft and pliable and hence does not tend to wear machine elements through which the splice passes during processing. Also, the splice is not affected by most bleaches such as ferric chloride and ferricyanide. By utilizing any suitable support for the plastic material, such as kraft paper on which the plastic may be coated, a place is provided for identification.

It is, accordingly, one of the objects of the present invention to provide a method and apparatus for splicing web end portions together with plastic rivets that is of simple design and construction, thoroughly reliable and efficient in operation, and economical to manufacture.

The invention and its objects and advantages will become more apparent from the detailed description of the preferred embodiments presented below.

BRIEF DESCRIPTION OF THE DRAWINGS

In the detailed description of the preferred embodiments of the invention presented below, reference is made to the accompanying drawings, in which;

FIG. 1 is a perspective view of a preferred embodiment of the splicing apparatus of this invention in a retracted position;

FIG. 2 is an enlarged top plan view of a plastic patch;

FIG. 3 is a section view taken substantially along line 3—3 of FIG. 2;

FIG. 4 is a segmental top plan view of the platen of FIG. 1;

FIG. 5 is a section view taken along line 5—5 of FIG. 4;

FIG. 6 is a perspective view of the apparatus of FIG. 1, illustrated in a splicing position;

DESCRIPTION OF THE PREFERRED EMBODIMENTS

Figure 7:
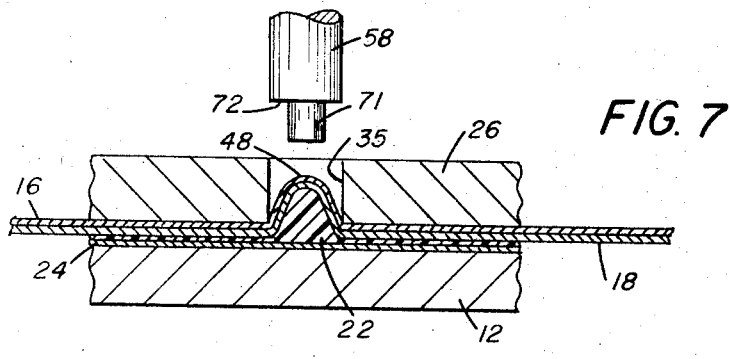
FIG. 7 is an enlarged section view taken substantially along line 7—7 of FIG. 4, and further illustrating a single heated pin and bubble formed by the web end portions and plastic patch sandwich in a compressed state.

Because splicing methods and mechanisms are well known, the present description will be directed in particular to elements forming part of, or cooperating more directly with, a method and apparatus in accordance with the present invention. Elements of splicing apparatus not specifically shown or described herein should be understood to be selectable from those known in the art.

With reference to the drawings, a splicing apparatus in accordance with a preferred embodiment of the invention is illustrated comprising a base 10 having a stage 12 mounted thereon provided with guide ribs 14 for receiving and guiding end portions of webs 16, 18 (FIG. 7) to be spliced together. The stabe 12 is provided intermediate its ends with a recess 20 for receiving a patch 22 (FIGS. 2 and 3) of thermoplastic material over which the web end portions are positioned to form a web-patch sandwich. The web end portions may be positioned in overlapping or abutting relation. Optimum splices have been achieved by using a commercially available chlorinated polyethylene plastic material designated MX 2243.25 produced by Dow Chemical Company, but it is believed that other types of chlorinated polyethylene and similar materials will work such as a thermoplastic material having any suitable foaming agent incorporated therein. Such foaming agents may be of any known type referred to in plastic encyclopedias or other literature. Other similar materials may be used such as ethylene acrylic copolymers, ethylene vinyl acetate copolymers, and polypropylene with maline groups substituted by meleic anhydrides. In addition, low melt viscosity elastomeric polyesters should work such as aliphatic polyesters and polyesters modified with polyethylene. In addition, it is possible that natural and synthetic rubbers may work. It is believed that any suitable material will work provided the material has the property of becoming viscoelastic and expanding when subjected to heat and pressure. The plastic material may be coated on a support 24, such as a piece of kraft paper or the like. Since chlorinated polyethylene material tends to stretch in tension, the paper support 24 adds strength to the patch, making the chlorinated polyethylene material easier to handle, and further provides a place for written identification. Normally, the depth of the recess is substantially equal to the thickness of support 24, and the plastic material 22 extends above the surface of stage 12. The minimum thickness of plastic chlorinated polyethylene needed to effectively splice acetate and Estar webs appears to be about substantially 17 mils. The material 22 extends above the surface of stage 12. The optimum plastic material thickness desired is believed to range between 17 and 25 mils.

Figure 8:
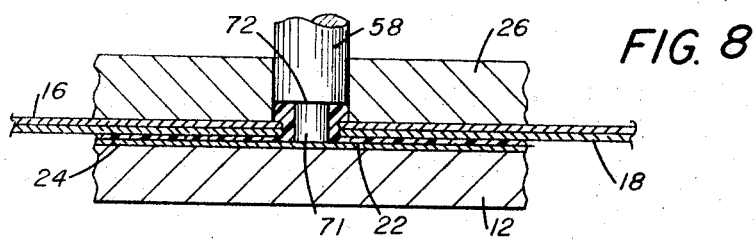
FIG. 8 is a view similar to FIG. 7, illustrating the insertion of the hot pin in the bubble and the flow of plastic material.

A compressing means for pressing the web-patch sandwich on stage 12 to place the plastic 22 under pressure comprises a pressure platen 26 having rearwardly extending arms 28 pivotally mounted on a stub shaft 30 supported by mounting brackets 32 secured to base 10. The platen 26 is provided with a main bore 33 terminating in one or more openings 35 (FIGS. 4 and 5) for a purpose to be explained hereinafter, and is further pivotally movable into pressure engagement with stage 12, as best illustrated in FIGS. 7 and 8, for compressing the web-patch sandwich between 0.005 to 0.010 of an inch. The platen 26 has a latch lever 34 at the front end thereof pivotally mounted on a pin 36 supported by bifurcated arms 38 on platen 26. The latch lever 34 has a knob 40 at one end for moving platen 26, and a hook 42 at the other end for engaging a cross bar 44 mounted on base 10 for releasably latching platen 26 to base 10. When lever 34 is moved to its latched position (FIG. 6), a predetermined amount of pressure within a range of 100 to 200 psi for chlorinated polyethylene is exerted on the web-patch sandwich. The pressure may have to be increased for other splicing materials such as a thremoplastic having a high viscosity when melted. The pressure is adjusted by a screw 45 on latch lever 34 which varies the distance between hook 42 and pin 36. The platen opening 33 in the latched position of platen 26 is substantially in register with plastic patch 22, as best seen in FIG. 7. When the web-patch sandwich is subjected to pressure by latched platen 26, the plastic flows into openings 35 and raises the web end portions therein to form a pressurized bubble 48, as illustrated in exaggerated form in FIG. 7.

Figure 10:
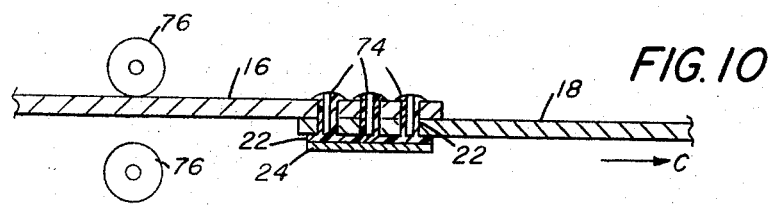
FIG. 10 is a section view taken substantially along line 10—10 of FIG. 9.
Figure 9:
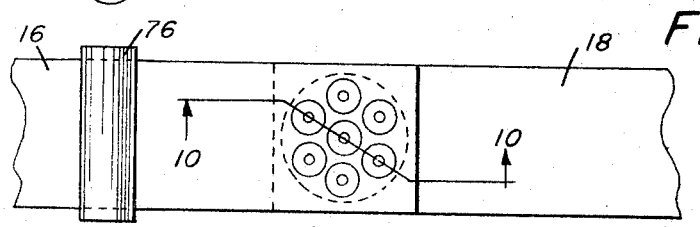
FIG. 9 is a top plan view of web end portions spliced together by plastic rivets formed by a plurality of pins and corresponding bubbles.
Figure 11:
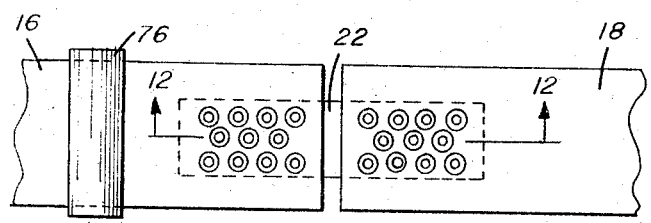
FIG. 11 is a view similar to FIG. 9, illustrating a plastic rivet butt splice.

A heating means for puncturing bubble 48 and heating the plastic 22 to a visco-elastic state comprises a two-part insulating carriage 50 (FIG. 1) secured to laterally extending flanges 52 on spaced-apart arms 54. The carriage parts 50 are slidably movable together with any suitable means to support a cylindrical resistive heating plug or element 56 connected to any suitable electrical source, and having one or more spaced-apart pins 58 extending from one end thereof. The arms 54 are provided with a handle 60 at one end, and depending legs 62 at the other end rotatably mounted on stub shaft 30 to form a pivotal frame for moving the heating element 56 into and out of bore 33. A brace rod 64 interconnects legs 62 to impart rigidity to arms 54, and springs 66 (FIG. 1) are provided for holding the frame in a normal retracted position. Each spring 66 has one end connected to a pin 68 spanning arms 54, an intermediate portion trained over a pulley 70 on rod 64, and its other end secured to base 10. When the frame is moved by handle 60 to the splicing position illustrated in FIG. 6, the heating element 56 enters bore 33 in platen 26 and pins 58 are moved into openings 35 to the position illustrated in FIG. 8. In this position, necked down heads 71 of heated pins 58, only one of which is shown, burns a hole through the overlapped web end portions 16, 18 and enters the plastic material 22 in bubble 48. The plastic is changed to a visco-elastic state, and the combination of heat, pressure and gas formation within bubble 48 forces the visco-elastic plastic through the web holes around pins 58 and over the outer surface of web 16, where it is confined by shoulders 72 of heating elements 58 surrounding pin heads 71. The heat applied to heating element 56 and pins 58 is momentary, and preferably should be above substantially 650°F for chlorinated polyethylene material. Optimum splices have been achieved with chlorinated polyethylene material when the temperature of the pins is maintained within the range of 700°F to 800°F. The temperature and duration of heat application will vary depending upon the melt temperature of the splicing material and can be controlled by any suitable electrical logic control circuit, as is well known in the art. The visco-elastic plastic 22 solidifies, and the characteristics thereof undergo a change forming rivets 74 on the side of web 16 opposite support 24 that are harder than the original plastic. The spliced web end portions 16, 18 can be transported by any suitable means in the direction of arrow C (FIGS. 10 and 12) through a pair of pressure rollers 76 for reducing the thickness of the splice. Although only a single pin 58 on heating element 56 is sufficient to provide a splice having a predetermined strength, a larger number of such pins can be desirably arranged in any suitable configuration, as seen in FIGS. 9 and 11, depending on the ultimate splice strength desired. Although heating element 56 is illustrated as cylindrical and plastic patch 22 as circular, any other suitable shapes can be employed.

Figure 12:
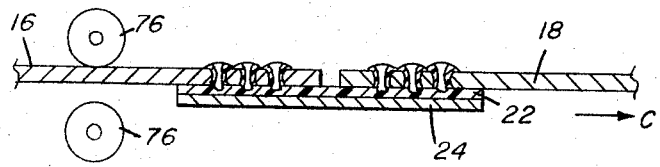
FIG. 12 is a section view taken substantially along line 12—12 of FIG. 11.

In FIGS. 11 and 12, a butt splice is illustrated in which the web end portions 16, 18 are placed on a rectangular-shaped plastic patch 22 of chlorinated polyethylene or the like. Naturally, the recess 20, platen opening 46, and heating element 56 for accommodating the rectangular plastic patch have to be of a new rectangular configuration.

The invention has been described in detail with particular reference to preferred embodiments thereof, but it will be understood that variations and modifications can be effected within the spirit and scope of the invention as described hereinabove.

What is claimed is:

1. A method of forming a rivet splice comprising the steps of:

placing a patch of compressible material on a base in which said material has the property when heated of becoming viscous and forming gas causing the material to expand;

placing two web ends over said patch to form an unheated patch and web sandwich;

pressing said unheated patch and web sandwich together along surface portions thereof surrounding an unpressed portion causing the material in said patch between said surface portions to flow into said unpressed portion to form a bubble of unheated material in said unpressed portion; and piercing said bubble of unheated material with a hot pin whereby said web is ruptured and the combination of heat, pressure and gas applied to the unheated material causes the material to melt and to expand around the pin and through said web to form a rivet, when cooled on the opposite side of said web from said patch.

2. The method according to claim 1 wherein said patch material is a thermoplastic, and further including the step of confining said melted expanding thermoplastic.

3. The method according to claim 1 wherein said patch material is chlorinated polyethylene.

4. The method according to claim 1 wherein said patch comprises a thermoplastic material coated on a paper support.

5. The method according to claim 1 wherein saaid web ends are placed in overlapping relation.

6. The method according to claim 1 wherein said web ends are placed in abutting relation.

7. The method according to claim 1, and including the further step of compressing the splice.

8. The method according to claim 1, and including the further step of flattening the rivets to compress the splice.

* * * * *